United States Patent
Mieth et al.

(10) Patent No.: US 12,242,254 B2
(45) Date of Patent: Mar. 4, 2025

(54) PRODUCTION SYSTEMS AND PRODUCTION CONTROL METHODS WITH LOCATING SYSTEM-BASED SIMULATIONS OF PRODUCTION SEQUENCES

(71) Applicant: TRUMPF Werkzeugmaschinen GmbH + Co. KG, Ditzingen (DE)

(72) Inventors: Carina Mieth, Gerlingen (DE); Jens Ottnad, Karlsruhe (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 711 days.

(21) Appl. No.: 17/517,890

(22) Filed: Nov. 3, 2021

(65) Prior Publication Data
US 2022/0057787 A1 Feb. 24, 2022

Related U.S. Application Data

(63) Continuation of application No. PCT/EP2020/062465, filed on May 5, 2020.

(30) Foreign Application Priority Data

May 10, 2019 (DE) .......................... 102019206756.5

(51) Int. Cl.
G05B 19/418 (2006.01)
(52) U.S. Cl.
CPC ............. *G05B 19/41865* (2013.01); *G05B 2219/35005* (2013.01); *G05B 2219/40068* (2013.01)
(58) Field of Classification Search
None
See application file for complete search history.

(56) References Cited

U.S. PATENT DOCUMENTS 7,518,511 B1    4/2009  Panja et al.
8,073,667 B2 *  12/2011 Strang ................. G06F 30/23
                                                700/121
(Continued)

FOREIGN PATENT DOCUMENTS

DE    102009053292 A1    5/2011
DE    102016120131        4/2018
(Continued)

OTHER PUBLICATIONS

DE Office Action in German Appln. No. 102019206756.5, dated Mar. 10, 2020, 16 pages (with English translation).
Huang et al., "A real-time location system based on RFID and UWB for digital manufacturing workshop," Procedia CIRP, Jan. 1, 2017, 63:132-7.

(Continued)

*Primary Examiner* — Howard Cortes
(74) *Attorney, Agent, or Firm* — Fish & Richardson P.C.

(57) ABSTRACT

The disclosure relates to digital models of a production apparatus. The digital models can generate simulations of production sequences of the production apparatus, and a controller can access the simulation to improve operations of the production apparatus. The digital model uses data of a locating system to create the simulation. The locating system monitors carriers for transporting components. The controller can compare parameters of the simulation results with corresponding parameters of earlier simulation results and/or actually obtained parameters of earlier production sequences, which can be stored in a model library. The disclosure further relates to corresponding production control methods.

19 Claims, 1 Drawing Sheet

(56) References Cited

U.S. PATENT DOCUMENTS

| | | | |
|---|---|---|---|
| 11,009,856 B2 | 5/2021 | Kiefer et al. | |
| 11,229,980 B2* | 1/2022 | Deiss | B23K 10/00 |
| 2011/0077926 A1* | 3/2011 | Amthor | G05B 19/4069 |
| | | | 703/6 |
| 2011/0264416 A1* | 10/2011 | Muller | G05B 19/418 |
| | | | 703/1 |
| 2015/0209960 A1* | 7/2015 | Li | G06F 30/20 |
| | | | 700/250 |
| 2016/0193692 A1* | 7/2016 | Regaard | B23K 31/125 |
| | | | 219/121.62 |
| 2017/0199518 A1* | 7/2017 | Stoeckel | G05B 19/41885 |
| 2020/0183370 A1* | 6/2020 | Pelella | G05B 17/02 |
| 2020/0201285 A1* | 6/2020 | Hirooka | G06V 30/422 |

FOREIGN PATENT DOCUMENTS

| | | | | |
|---|---|---|---|---|
| DE | 102017120378 A1 | 3/2019 | | |
| WO | WO 2014/090310 | 6/2014 | | |
| WO | WO-2018073421 A2 * | 4/2018 | | G01S 11/08 |
| WO | WO 2020/212722 | 10/2020 | | |

OTHER PUBLICATIONS

PCT International Preliminary Report on Patentability in International Appln. No. PCT/EP2020/062465, dated Nov. 16, 2021, 8 pages.

PCT International Search Report and Written Opinion in International Appln. No. PCT/EP2020/062465, dated Aug. 3, 2020, 9 pages.

* cited by examiner

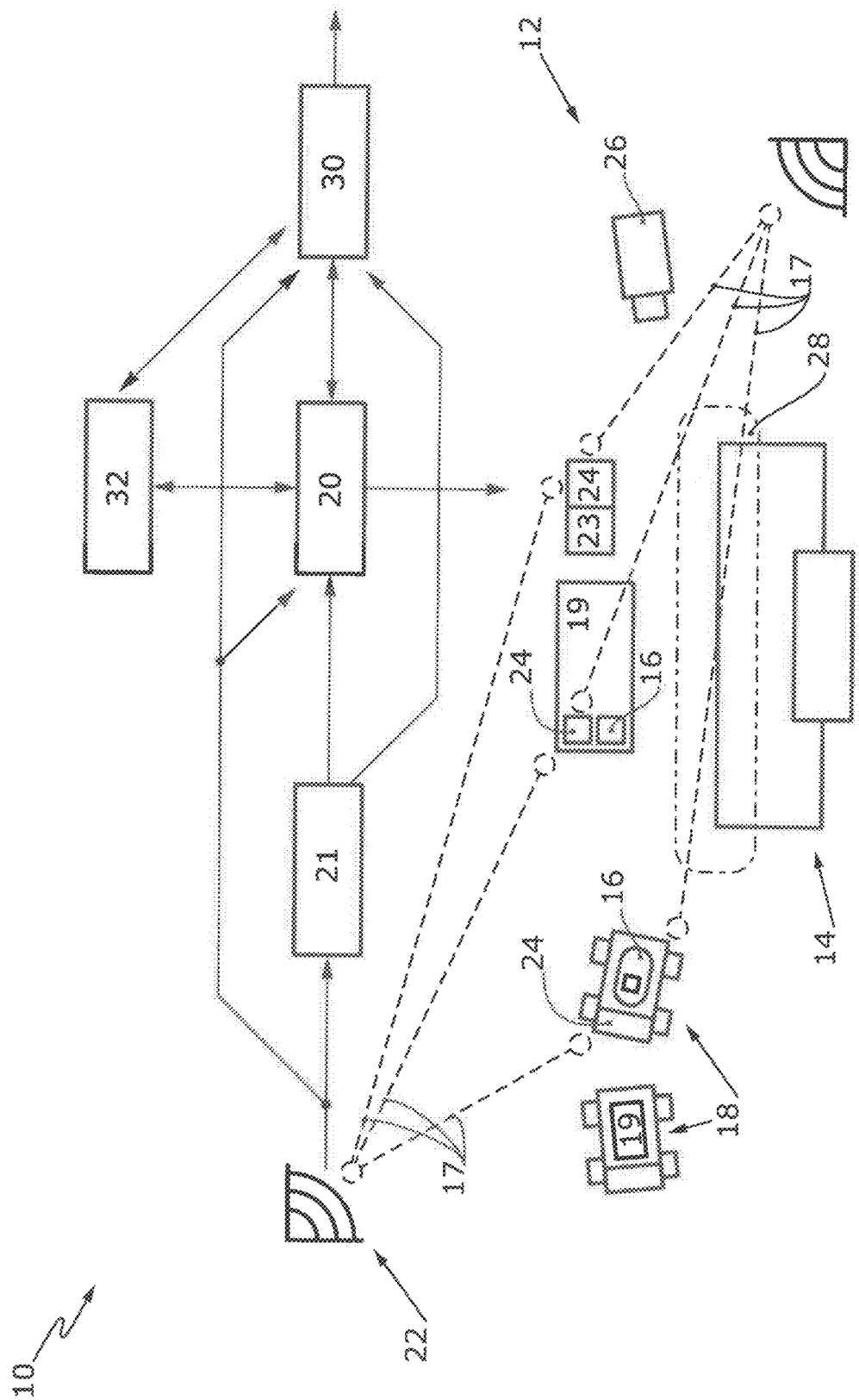

PRODUCTION SYSTEMS AND PRODUCTION CONTROL METHODS WITH LOCATING SYSTEM-BASED SIMULATIONS OF PRODUCTION SEQUENCES

CROSS REFERENCE TO RELATED APPLICATIONS

This application is a continuation of and claims priority under 35 U.S.C. § 120 from PCT Application No. PCT/EP2020/062465, filed on May 5, 2020, which claims priority from German Application No. 10 2019 206 756.5, filed on May 10, 2019. The entire contents of each of these priority applications are incorporated herein by reference.

TECHNICAL FIELD

The invention relates to production systems and production control methods.

BACKGROUND

It is known to provide optimized production systems having a production apparatus, in particular in metal processing, preferably sheet-metal processing, for producing components, wherein the production apparatus comprises a plurality of production tools. The transport of material or components between the production tools is effected by mobile carriers.

On account of the different processing times of the production tools and varying transport paths of the carriers, it often happens that the production tools and/or the carriers are not fully utilized to capacity. The production system then operates ineffectively.

It is furthermore known to create simulations of production sequences. However, the creation of such simulations is associated with production tool complexity. It can take months until a simulation delivers benefits and answers relevant questions.

SUMMARY

The present disclosure provides effective production systems and production control methods that have the following features and elements:
  a) A production apparatus having production tools for manufacturing components. The production apparatus includes carriers and/or transport aids for transporting the components between the production tools. The carriers can be embodied, for example, in the form of autonomous or self-driving and/or remote-controlled carts.
  b) A controller arranged and configured to control the production apparatus on the basis of production data.
  c) A locating system embodied to localize the carriers, transport aids, production tools, and/or components. In this case, the locating system is embodied
    i) to determine the position of a mobile unit, and/or
    ii) to detect identification information stored on the mobile unit and communicate the position data thus determined of the carriers, transport aids, production tools and/or components to the controller.
  d) A digital model of the production apparatus for simulation of production sequences. In this case, the simulation is based on the data of the locating system, which means that the simulation actively uses the data of the locating system to create the digital model.

As used herein, "production data" are taken to mean, for example, data that determine the course of production of components, for example, in the following form: Component A consists of a material ST, has the dimensions x,y,z, is cut to a desired contour at a laser cutting apparatus of type LS, is then bent according to plan MP at a bending machine of type TP, etc.

The controller controlling the production apparatus is designed to use these production data to control the production of the components. In this case, the order of the production steps, transport between the production tools, temporary storage possibly required, re-sorting, and much more can be produced in the controller. In this case, individual production steps can be carried out fully automatically by the corresponding production tools. The controller can then be designed to make the corresponding data available to the corresponding machine tools, optionally after having been conditioned. Correspondingly equipped production tools can optionally feed back to the controller the status and the success of the production steps carried out by them. In the case of other, less automated production tools and work steps, actions of a worker are necessary (e.g. sorting, clamping, feeding material, or in many bending processes). Manual feedback regarding the status and, if appropriate, the success of the production steps is often effected here. Particularly in the case of production apparatuses comprising such production tools, the advantages of the invention are manifested, because the position data of carriers and/or components, information about residence durations, statuses, success, and work steps can be tracked by way of the locating system.

A plurality of components can also be combined to form a component assemblage. A component assemblage means a collection of components which are organizationally linked to one another, e.g., belong to a common manufacturing order, or pass through a plurality of production steps jointly. It can be advantageous, by means of the locating system, in each case to determine the position data of a component assemblage and to make these data available to the digital model.

The components or component assemblages can be arranged on or in one or a plurality of transport aids. A transport aid can be, e.g., a pallet (e.g., a transport pallet) or a collecting container (e.g., a transport box, crate, or case). The transport aids can be transported by the carriers. A plurality of components and/or component assemblages can be arranged on a transport aid for transport purposes. Additionally or alternatively, a mobile unit for locating purposes can be assigned to each transport aid. It can be advantageous, by means of the locating system, in each case to determine the position data of a transport aid and to make these data available to the digital model.

Additionally or alternatively, a mobile unit for locating purposes can be assigned to each carrier. It can be advantageous, by means of the locating system, in each case to determine the position data of the carriers and to make these data available to the digital model.

Mobile tools, such as, e.g., handheld tools (e.g., drills, deburrers, hand saws, angle grinders, and movable machines, such as, e.g., stamping, welding, or induction heating units, etc.), are also used in many production apparatuses. It can be advantageous, by means of the locating system, in each case to determine the position data of the mobile tools and to make these data available to the digital model. To that end, a mobile unit can also be assigned to the mobile tools, and in particular be secured fixedly thereto.

A mobile unit can be assigned to a carrier, to a transport aid, to a component, and/or to a component assemblage and, for example, also to a mobile tool. That is intended to mean that the mobile unit a) is arranged in the vicinity of the tool, carrier, transport aid, component, and/or component assemblage and
b) is also assigned to said tool, carrier, transport aid, component, and/or component assemblage in terms of data technology, that is to say, e.g., to the production data of the controller, and/or to the digital model for simulation.

A mobile unit can be embodied as transceiver units embodied to receive and to transmit electromagnetic signals. In this case, the time of flight of these signals can be determined by the locating system and the instantaneous position in the production apparatus can thus be determined. Locating with an accuracy of 1 m or less, for example, 30 cm or less, is achievable in this way. The locating of the units can be detected repeatedly per minute, for example, repeatedly per second, e.g., repeatedly per 1/10 second.

It has been found in the context of the development of the present disclosure that it is advantageous to obtain relevant input data for the generation and parameterization of the simulation. These data can be obtained by a locating system, which is being introduced into many production apparatuses with increasing digitalization. The position data thus determined of carriers, transport aids, components, and/or component assemblages can be used to constantly further improve the digital model for simulation. In this case, an abovementioned accuracy of the location determination is particularly suitable for making the digital model suitable for a simulation.

The production system according to the invention thus comprises a digital model of the production apparatus, said digital model being able to simulate the sequences in the production apparatus. The data of the carriers and the movement patterns thereof are stored in the digital model. In addition thereto, the digital model can be embodied to take account of work processes of the production tools. As a result, the digital model can generate proposals for particularly effective production sequences that take account of the movements of the carriers, transport aids, components, and/or component assemblages and possibly also tools. It has been found that taking account of the data of the locating system in the simulation of the production sequences results in surprisingly effective production sequences.

The simulation can be stored in the form of a material flow simulation. This means that the change in position of the components over time (the flow) is stored in the form of a simulation.

In some embodiments, at least one production tool is embodied in the form of a metal processing tool, e.g., a sheet-metal processing tool, a stamping machine, and/or a laser cutting machine. In some embodiments, at least one component or workpiece can be embodied in the form of a sheet-metal part.

In certain embodiments, the controller of the production system is configured to carry out the control of the production apparatus on the basis of the simulation. An automated optimization of the production apparatus can be achieved as a result.

The control is effected on the basis of production data of the production apparatus. These production data include—as explained above—at least the data of the locating system of the carriers. In one configuration of the disclosure, the production data furthermore include the abovementioned work processes of the production tools, the arrangement of the production tools, characteristic parameters of the production tools, and/or component data. Characteristic parameters of the production tools can be, e.g., laser beam intensity, laser beam focus, bending tool used, throughput speed, feed speed, pulse ratio during pulsed operation, power, energy, etc., all being related to the respective work steps. Characteristic parameters of the component data can be, e.g., material, contour, dimensions, deformations, thickness, etc.

In other embodiments, the production systems include a model library having simulated and/or actually implemented production sequences. In this case, the controller can be embodied to compare the production sequence simulated in the digital model with the production sequences of the model library. The controller can then decide or leave it to a user to use the newly simulated production sequence or to have recourse to a production sequence stored in the model library.

In some embodiments, the simulation, the digital model, and/or the model library are/is embodied in a cloud-based fashion. This makes it possible to have recourse to actual and/or simulated production sequences of a plurality of production apparatuses and, in association therewith, very effective possibilities for optimization of the production apparatus described above.

As used herein, "cloud" means, for example, a spatially remote, e.g., anonymized, data processing device, such as a storage device or system. This cloud can store data from more than one user, advantageously from hundreds or thousands of different users. As a result, different simulations or models can contribute to the improvement of the methods independently of the manufacturing site. It has been recognized that the methods described herein can be significantly improved if hundreds, e.g., thousands, of simulations are read out. Such an amount of data is often not attainable in a year for an individual manufacturing facility.

The locating systems described herein can be embodied as an ultra-wideband (UWB) system to enable a high locating accuracy. Such a system is described as an interior locating system for example in DE 10 2017 120 378 A1 or the application WO 2929/212722 (PCT/FR2019/000057) entitled: "Ultra-Wideband Location Systems and Methods." As described therein, such a system can be integrated into a production apparatus that still has little digital networking, and can thus help to advance the digital networking without overly high investment. At the same time, the data about the production sequences that are obtainable in this way can be acquired both spatially and at the same time temporally. In this way, data for the simulation of production sequences can be obtained without further investment in hardware. The content of DE 10 2017 120 378 A1 and the content of WO 2929/212722 (PCT/FR2019/000057) are concomitantly incorporated herein by reference in their entirety.

Other types of locating systems include omlox—the open locating standard, wi-fi, GPS, 5G, RFID, or Bluetooth Low Energy (BLE) locating systems.

In some embodiments, the locating systems are embodied to detect the positions of the mobile units, carriers, transport aids, components, and/or component assemblages and possibly also tools with an accuracy of 1 meter or less than 1 meter, e.g., of less than 0.3 meter. This provides further increased possibilities for improvement of the production apparatus. The locating systems can furthermore be embodied to detect the positions three-dimensionally. It is then possible to acquire position data not only in terms of the area of the production apparatus, but also in terms of the height, and to feed them to the simulation.

The digital models can include a map of a part of the production apparatus or of the complete production apparatus. The map can include information concerning the production tools and/or components, and, for example, the position and orientation thereof.

The carriers can include image capturing modules, e.g., in each case a laser scanner and/or a camera, to capture their surroundings, e.g., to update the map.

The carriers and/or transport aids can include at least one further sensor. For example, the carriers can include an inertial measurement unit "IMU"), e.g., with the combination of a plurality of inertial sensors such as acceleration sensors and rate-of-rotation sensors.

The carriers and/or transport aids can include a transceiver system for automatically and contactlessly identifying and localizing the carriers, for example, on the basis of RFID (radio-frequency identification).

The controller can include an interface to process log files of the production tools.

In one configuration, at least one production tool includes a loading zone for loading and unloading a carrier. In this case, the production system can include an image recording unit embodied to capture image information in the loading zone. The locating system can furthermore include an image evaluation unit embodied to determine the position and/or a state of a carrier, e.g., the loading thereof, using the image information. The image recording units can be extended or augmented by means of VR (virtual reality) systems or AR (augmented reality) systems.

In another aspect, the disclosure provides production control methods of a production system, e.g., of the production systems described here, wherein the production control methods include at least the following steps:

detecting position and/or identification information of one or more of a carrier, transport aid, production tool, and a component, wherein the detecting in is effected by a locating system to produce locating system data;

simulating a production sequence to produce simulation results, wherein the simulation is based on the locating system data; and controlling a production apparatus, e.g., effected on the basis of the simulation results, wherein the simulation includes a digital model of the production apparatus.

The production control methods can further include the following step (e.g., between the simulating and controlling steps):

comparing the digital model with previously simulated and/or actually implemented production sequences stored in a model library.

The production control methods described here can be improved particularly effectively as a result.

To obtain as comprehensive a model library as possible, the simulated production sequence can be stored in any case, regardless of whether the production sequence is actually implemented with this simulated production sequence or with a previously stored production sequence.

Further advantages of the invention are evident from the description and the drawing. Likewise, the features mentioned above and those that will be explained further below can be used in each case individually by themselves or as a plurality in any desired combinations. The embodiments shown and described herein should not be understood as an exhaustive enumeration, but rather are examples for outlining the disclosure.

The simulation can make its results available to a further VR (virtual reality) system or AR (augmented reality) system for production planning purposes. In addition, the simulation can have recourse to data of the further VR (virtual reality) system or AR (augmented reality) system for production planning purposes.

In another aspect, the disclosure provides methods of utilizing data, e.g., position data of a locating system described herein, in a production control method and/or production system described herein. The position data can include position data of carriers and/or components and/or transport aids and/or tools, which are acquired during the operation of the production apparatus to track the components or workpieces.

DESCRIPTION OF DRAWING

FIG. 1 is a schematic view of a production system as described herein and, respectively, of a production control method as described herein.

DETAILED DESCRIPTION

FIG. 1 shows a production system 10 having a production apparatus 12 including a plurality of production tools 14. The production tools 14 are used for producing components 16. In some embodiments, at least one production tool 14 is embodied in the form of a metal or sheet-metal processing tool, e.g., a stamping machine and/or a laser cutting machine. At least one component 16 can be embodied in the form of a sheet-metal part.

At least one component 16, or a plurality of components 16, e.g., a plurality of components 16 combined to form a component assemblage, is/are transported between production tools 14 by carriers 18. The components are the parts combined to produce a complex product. The carriers can be, for example, automated guided vehicles. The carriers 18 are controlled by a controller 20 and tracked or monitored by a locating system 22. The controllers can be, for example, processors, ASICs, or FPGAs. The locating systems can be or include omlox—the open locating standard, wi-fi, ultra-wideband (UWB), GPS, 5G, RFID, or Bluetooth Low Energy (BLE) locating systems, for example. The locating system 22 can include a plurality of transceiver units to determine the position of the carriers 18 in the production apparatus 12 by means of the calculation of signal times-of-flight between the transmitters and the carriers 18. The transceiver units can be embodied to receive and to transmit electromagnetic signals. In this case, the time-of-flight of these signals can be determined by the locating system 22 and the instantaneous position in the production apparatus 12 can thus be determined. A plurality of the transceiver units can be fixedly installed units, the positions of which are known to the locating system 22. In this case, the identification of the carriers 18 in the locating system 22 is effected by means of mobile units 24, which are arranged or embodied in each case indirectly or directly on the carriers 18. Alternatively or additionally, further mobile units can be assigned to a transport aid, component, and/or component assemblage and possibly also to tools. In this regard, the positions of these units can also be tracked.

The mobile units 24 can themselves be embodied as transceiver units embodied to receive and to transmit electromagnetic signals (indicated by dashed lines 17), and can include omlox markers, UWB tags, or other hardware tags, for example. In this case, the time-of-flight of these signals can be determined by the locating system 22 and the instantaneous position in the production apparatus 12 can thus be determined. Locating with an accuracy of 1 meter or less, e.g., 30 cm or less, is achievable in this way.

The mobile units 24 can be assigned to the carriers 18, transport aids 19 and/or individual components 16 and/or component assemblages and also tools 23. The data of the locating system 22 can then be assigned to the job orders of the production controller.

The unloading and loading of the carriers 18 can be effected—in particular in a manner monitored by an image recording unit 26, e.g., a camera, a 3D camera, or light detection and ranging (LIDAR) system, in a loading zone 28 of the production tool 14. In this case, for the purpose of optimizing the production apparatus 12, the controller 20 can be embodied to have recourse to the data of the image recording unit 26. Such a system is described for example in the document DE 10 2016 120 131 A1. The content of DE 10 2016 120 131 A1 is concomitantly incorporated herein by reference in its entirety.

The controller 20 has recourse to a digital model 30 of the production apparatus 12. Digital modelling of factories and production sequences are known (e.g., FlexSim®). A simulation of the production sequences of the production apparatus 12 can be implemented in the digital model 30. This simulation is based on the data of the locating system 22. As a result, the simulation becomes particularly precise.

The data of the locating system 22 can be processed in a data processing and analysis unit 21 (e.g., a processor, computer, ASIC, or FPGA) before they are fed to the controller 20. The data processing and analysis unit 21 can condition the position data, that is to say, e.g., associate them with the production tools, assign data to a specific work step, such as transport A-B, manufacturing step on machine C, manufacturing on machine D, sorting and placement on transport aid E, transport by carrier F to bending machine G, etc.

Additionally or alternatively, however, the data of the locating system 22 can also be fed directly to the controller 20. The controller 20 can then improve the simulation during ongoing manufacturing, which is to say, during production operation, and update the digital model 30.

Additionally or alternatively, however, the data of the locating system 22 can also be fed directly to the digital model 30. The digital model 30 can then even more rapidly improve the simulation during ongoing manufacturing and update the digital model 30.

Additionally or alternatively, the data of the locating system 22 can be processed in the data processing and analysis unit 21 before they are fed to the digital model 30.

In addition to the data of the locating system 22, the data of the production tools 14 and/or of the image recording unit 26 can influence the simulation.

The simulation, i.e. the simulation results, are made available to the controller 20. Furthermore, the controller 20 can be embodied to have recourse to a model library 32 having a plurality of simulations or simulation results. The controller 20 can be embodied to carry out automatically, and/or upon the instruction of a user, the control of the production apparatus 12, optionally with the parameters used during the simulation or with parameters from the model library 32.

Additionally or alternatively, the digital model 30 can be embodied to have recourse to the model library 32 having a plurality of simulations or simulation results. The digital model 30 can be embodied to use automatically, and/or upon the instruction of a user, the parameters used for the simulation or the parameters from the model library 32.

The digital model 30 and/or the model library 32 can be embodied in a cloud to enable a plurality of users to have access to a large data set.

Taking all the FIGURES of the drawing jointly into consideration, the present disclosure relates in summary to a digital model 30 of a production apparatus 12. The digital model 30 is embodied to generate a simulation of a production sequence of the production apparatus 12. A controller 20 can access the simulation to most efficiently operate the production apparatus 12. The digital model 30 is embodied to use data of a locating system 22 for creating the simulation. The locating system 22 monitors carriers 18 for transporting components 16. The controller 20 can be embodied to compare parameters of the simulation results with corresponding parameters of earlier simulation results and/or actually obtained parameters of earlier production sequences. These parameters of earlier simulation results and/or actually obtained parameters may be stored in a model library 32. By virtue of the methods and systems described herein, the controller 20 is able to control the production apparatus 12 very effectively. The present disclosure furthermore relates to a correspondingly implemented production control methods.

OTHER EMBODIMENTS

It is to be understood that while the inventions have been described herein in conjunction with the detailed description thereof, the foregoing description is intended to illustrate and not limit the scope of the inventions, which is defined by the scope of the appended claims. Other aspects, advantages, and modifications are within the scope of the following claims.

LIST OF REFERENCE SIGNS

10 Production system
12 Production apparatus
14 Production tool
16 Component
17 Electromagnetic signals
18 Carrier
19 Transport aid
20 Controller
21 Data processing and analysis unit
22 Locating system
23 Tool
24 Mobile unit
26 Image recording unit
28 Loading zone
30 Digital model of the production apparatus
32 Model library

What is claimed is:

1. A production system comprising:
    a production apparatus having
        i) one or more production tools for manufacturing components, wherein parameters of the production tools include one or more of laser beam intensity, laser beam focus, bending tool used, throughput speed, feed speed, pulse ratio during pulsed operation, power, and energy, and
        ii) one or more carriers or transport aids, or both carriers and transport aids, arranged and configured to transport the components between the production tools;
    a controller arranged and configured to control the production apparatus on the basis of production data;
    a locating system for localizing a mobile unit arranged or embodied on any one or more of the carriers, components, production tools, or transport aids, wherein the locating system is configured to
  i) determine the position of the mobile unit,
  ii) detect identification information stored on the mobile unit and to communicate the position data thus determined of the one or more of the carriers, components, production tools, and transport aids to the controller, or
  iii) both i) and ii); and
a digital model of the production apparatus that provides a simulation of production sequences, wherein the simulation is based at least on the data of the locating system,
wherein the production system comprises a model library having simulated production sequences, actually implemented production sequences, or both simulated and actually implemented production sequences, wherein the controller is configured to compare the production sequence simulated in the digital model with the production sequences of the model library, and
wherein at least one production tool of the production apparatus comprises a loading zone for loading and unloading a carrier or transport aid, wherein the production system comprises an image recording unit configured to capture image information in the loading zone, and wherein the locating system comprises an image evaluation unit configured to determine a loaded or unloaded state of a carrier or transport aid using the image information.

2. The production system of claim 1, wherein the controller is configured to control the production apparatus on the basis of results of the simulation.

3. The production system of claim 1, wherein the production data comprise one or more of production sequences, arrangements of the production tools, characteristic parameters of the production tools, and component data.

4. The production system of claim 1, wherein in the power is laser power, and wherein the energy is laser energy.

5. The production system of claim 1, wherein the power is stamping power, and wherein the energy is stamping energy.

6. The production system of claim 3, wherein the characteristic parameters of the component data include one or more of material, contour, dimensions, deformations, and thickness.

7. The production system of claim 1, wherein the carriers or transport aids, or both the carriers and transport aids, comprise at least one sensor.

8. The production system of claim 1, wherein the simulation, the model library, or both the simulation and the model library are embodied in a cloud-based fashion.

9. The production system of claim 1, wherein the locating system comprises an ultra-wideband system.

10. The production system of claim 1, wherein the locating system is configured to detect the position of the carriers with an accuracy of less than 1 meter.

11. The production system of claim 1, wherein the locating system is configured to detect the position of the carriers with an accuracy of less than 0.3 meters.

12. The production control system of claim 1, wherein the simulation is stored in the form of a material flow simulation.

13. The production system of claim 1, wherein at least one production tool comprises a metal processing tool.

14. The production system of claim 1, wherein at least one component or workpiece comprises a sheet-metal part.

15. The production system of claim 1, wherein the digital model comprises a map of a part of the production apparatus or of the complete production apparatus.

16. A production control method, the method comprising:
  (a) obtaining a production system comprising
    a production apparatus having
      i) one or more production tools for manufacturing components, wherein parameters of the production tools include one or more of laser beam intensity, laser beam focus, bending tool used, throughput speed, feed speed, pulse ratio during pulsed operation, power, and energy, and
      ii) one or more carriers or transport aids, or both carriers and transport aids, arranged and configured to transport the components between the production tools;
    a controller arranged and configured to control the production apparatus on the basis of production data;
    a locating system for localizing a mobile unit arranged or embodied on any one or more of the carriers, components, production tools, or transport aids, wherein the locating system is configured to
      i) determine the position of the mobile unit,
      ii) detect identification information stored on the mobile unit and to communicate the position data thus determined of the one or more of the carriers, components, production tools, and transport aids to the controller, or
      iii) both i) and ii); and
    a digital model of the production apparatus that provides a simulation of production sequences, wherein the simulation is based at least on the data of the locating system,
    wherein the production system comprises a model library having simulated production sequences, actually implemented production sequences, or both simulated and actually implemented production sequences, wherein the controller is configured to compare the production sequence simulated in the digital model with the production sequences of the model library, and
    wherein at least one production tool comprises a loading zone for loading and unloading a carrier or transport aid, wherein the production system comprises an image recording unit configured to capture image information in the loading zone, and wherein the locating system comprises an image evaluation unit configured to determine a loaded or unloaded state of a carrier or transport aid using the image information;
  (b) detecting position information, identification information, or both position information and identification information, of one or more of a carrier, a transport aid, a production tool, or a component by a locating system and producing locating system data;
  (c) simulating a production sequence to provide simulation results, wherein the simulation is based at least on the locating system data; and
  (d) controlling a production apparatus on the basis of the simulation results, wherein the simulation results comprise a digital model of the production apparatus.

17. The production control method of claim 16, further comprising comparing the digital model with simulated production sequences or actually implemented production sequences, or both, stored in a model library.

18. The production control method of claim 16, wherein the simulation is stored in the form of a material flow simulation.

19. The production method of claim 16, wherein the digital model comprises a map of a part of the production apparatus or of the complete production apparatus.

* * * * *